United States Patent Office 3,377,173
Patented Apr. 9, 1968

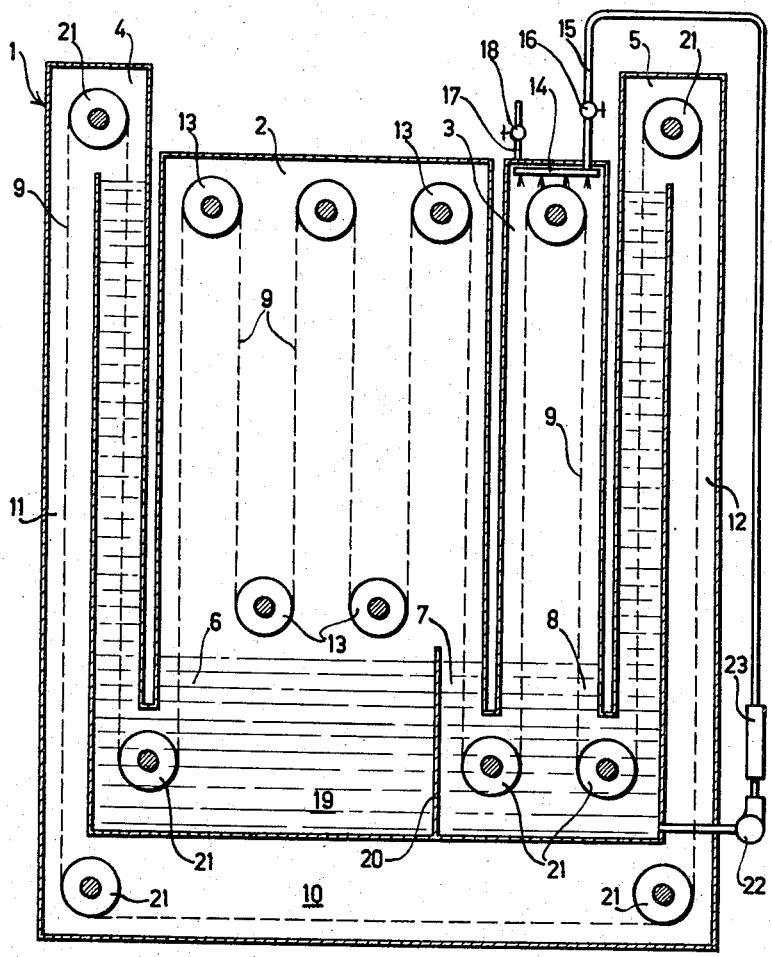

3,377,173
METHOD AND DEVICE FOR THE HEATING UNDER PRESSURE OF COMMODITIES PACKED IN CONTAINERS
Johannes Bernardus van der Winden, Amstelveen, Netherlands, assignor to Gebr. Stork & Co's Apparatenfabriek N.V., Amsterdam, Netherlands
Filed Nov. 24, 1964, Ser. No. 413,511
Claims priority, application Netherlands, Sept. 11, 1964, 64—10,660
9 Claims. (Cl. 99—214)

The invention relates to a device for the heating under pressure of commodities which are packed in containers, the device comprising two or more spaces where the packed commodities receive treatment, the said spaces being sealed from the ambient atmosphere and on their lower end communicating via a liquid seal with one another and with a supply column and a discharge column, the device further comprising a conveyor for the containers to be heated, which conveyor is capable of movement through the spaces where the containers receive treatment and through the columns, at least one of the said spaces being provided with means for maintaining, in operation, a super-atmospheric pressure. Such a device is known in various embodiments.

Sometimes there are, however, difficulties experienced with such an installation, especially if, in order to enhance the capacity thereof, the velocity of the conveyor is increased. In that case the problem is that the length of time of the cooling path in the discharge column becomes too small, which results in that the temperature and the pressure of the commodities in the containers are still too high at the time that these containers are again exposed to atmospheric pressure. Under these circumstances it sometimes occurs that the containers, when the same are in the shape of tins, bulge out in such a way that the seamed joint is damaged and the protection against leakage is destroyed. When the containers consist of glass jars with a wide aperture, closed by a cover with a large diameter, there is a risk that this cover owing to inner overpressure is pressed away from the jar.

It is an object of the invention to solve this problem and this is accomplished by providing a cooling path in which prevails almost the same pressure as in the heating space of the installation.

It is a further object of the invention to increase the speed of the conveyor whereby at least the first portion of the cooling path is at a pressure which is higher than the pressure of the atmosphere.

The invention also aims at achieving sufficient cooling and decrease of pressure in the interior of the containers, before the same are again exposed to the normal atmospheric pressure.

A still further object of the invention consists in improving the thermal economy by separating the two liquid seals, situated on the entry and discharge side respectively of the treatment space by an intermediate partition. This separation is of importance because on the one side of this intermediate partition (the supply side) there is produced a very small circulation of the liquid from the liquid seals in this area, whilst on the other side of this intermediate partition (the discharge side), due to the cooling liquid flowing down from the spraying members, a considerable circulation is produced.

The invention will hereinafter be described in greater detail with reference to the accompanying drawing in which a vertical longitudinal section of the device according to the invention is represented.

The device consists of a housing 1 provided with two treatment spaces 2 and 3, which are sealed from the atmosphere. There are further provided a supply column 4 and a discharge column 5. The treatment space 2 communicates via a liquid seal 6 with the supply column 4. On the other side this space 2 communicates via a liquid seal 7 with the treatment space 3. This space 3 communicates in turn via a liquid seal 8 with the discharge column 5.

Provided in the installation is a conveyor 9 for receiving and conveying the containers (not shown) to be treated. This conveyor 9 moves through the supply column 4, the treatment spaces 2 and 3 and the discharge column 5, the said conveyor being constructed as an endless chain, which finally moves through the lowermost portion 10 of the installation. In the latter portion or in the side portions 11, 12 respectively the supply and discharge of the containers can be effected in such well known manner to those skilled in the art as not requiring amplification.

Heating of the containers to be treated is effected at an overpressure in the treatment space 2. The conveyor 9 advances in a usual way over a plurality of sprocket wheels 13 so that a sufficiently long path is constituted within this space. The super atmospheric pressure in the space 2 is maintained with the aid of the increased liquid level in the columns 4 and 5.

The treatment space 3, situated closest to the discharge column 5, is in its upper region provided with spraying members 14 for a cooling liquid, which can be fed through a connection 15 with valve 16. There is further a connection 17 with a valve 18 for the supply of a gas under pressure. In this way the treatment space 3 can be utilized as a cooling space, in which space prevails the same or practically the same pressure as in the heating space 2.

The liquid seals 6, 7 and 8 have a common liquid space 19, which space is divided into two parts by an intermediate partition 20. In this space 19 are arranged three sprocket wheels 21 along which moves the conveyor 9, sprocket wheels 21 being also provided on the upper and lower end of the side portions 11 and 12.

The provision which is of special importance in the present invention consists of the spraying members 14 and the gas connection 17 in the upper area of the treatment space 3, which is situated closest to the discharge column 5. Hereby it is possible to constitute in this space a cooling path for the heated containers which leave the space 2, a super-atmospheric pressure prevailing in the said cooling path. This pressure can be achieved with the aid of supplied gas (generally), through the connection 17. The intermediate partition 20 ensures a separation of the cooler right part of the space 19 in respect of the warmer left part of the space. More liquid will circulate in this right part due to the cooling liquid, flowing down from the spraying members 14. A circulation can be produced between the liquid from the right part of the space 19 and the spraying members 14 by means of a conventional liquid pump 22, this circulation may traverse a cooling device 23.

It should be noted that the depicted installation has two treatment spaces 2 and 3, this number may, however, be greater according to the requirements to be met. The cooling space 3 can further be provided with two or more loops of the conveyor 9. It is further possible to dispose more than one intermediate partition in the lower liquid space 19, for instance also one between the liquid seals 7 and 8.

What I claim is:

1. A device for the heating under pressure of commodities which are packed in containers, the device having at least two spaces where the packed commodities receive treatment, the said spaces being sealed from the ambient atmosphere and on their lower end communicating via a liquid seal, the device being provided with a container supply column and a container discharge column in communication with the spaces via liquid seals, the device comprising a conveyor for the transport of the containers through the spaces where the containers receive treatment and through the columns, at least one of the said spaces being provided with means for maintaining a superatmospheric pressure in said spaces, spraying means disposed in the upper area of the treatment space situated nearest the discharge column for the supply of a cooling liquid for cooling the containers therein and means for supplying a gas under pressure into the upper area of said treatment space nearest the discharge column for maintaining the pressure therein at a level in substantial correspondence with that in the other of the spaces.

2. A device according to claim 1, comprising an intermediate partition in the liquid seal to define two liquid seals respectively on the entry side and the discharge side of the treatment space.

3. A device in which commodities packed in containers are advanced along a path through a heating zone at elevated pressure and then through a cooling zone, said device comprising liquid means in the heating and cooling zones at the lower ends thereof disposed in the path of the containers, the containers passing through the liquid means when passing from the heating zone to the cooling zone, means for spraying cooling liquid into the cooling zone for the cooling of the containers, and means for supplying gaseous pressure fluid in said cooling zone to maintain an elevated pressure therein substantially corresponding to that in the heating zone.

4. A device as claimed in claim 3, comprising pumping means for circulating liquid from the liquid means to the spraying means.

5. A device as claimed in claim 4, comprising a cooling device for cooling the liquid as it is circulated from the liquid means to the spraying means.

6. A device as claimed in claim 3, comprising partition means in said liquid means separating the liquid means in the heating zone from the liquid means in the cooling zone.

7. A device as claimed in claim 3, wherein said spraying means and the means for supplying gaseous pressure fluid are located at the upper end of the cooling zone.

8. A method comprising advancing containers containing commodities along a path through a heating zone and then through a cooling zone, maintaining a pressure greater than atmospheric in the heating zone, isolating the heating zone and the cooling zone by a liquid seal through which the containers pass as they advance from the heating zone to the cooling zone, spraying a cooling liquid into the cooling zone to cool the containers therein, and introducing a gaseous pressure fluid in the cooling zone to maintain the pressure therein at substantially the same value as in the heating zone so that the level of the liquid seal in the heating and cooling zones is the same.

9. A method as claimed in claim 8, comprising separating the liquid seal in the heating zone from that in the cooling zone.

References Cited
UNITED STATES PATENTS

| | | | |
|---|---|---|---|
| 2,660,512 | 11/1953 | Webster | 99—362 |
| 2,968,232 | 1/1961 | Carvallo | 99—360 |

FOREIGN PATENTS

| | | |
|---|---|---|
| 431,844 | 7/1935 | Great Britain. |
| 63,758 | 7/1949 | Netherlands. |

ROBERT W. JENKINS, *Primary Examiner.*